United States Patent [19]

Sakashita et al.

[11] Patent Number: 5,502,153
[45] Date of Patent: Mar. 26, 1996

[54] METHOD FOR PREPARING OPTICAL-GRADE POLYCARBONATE COMPOSITIONS

[75] Inventors: Takeshi Sakashita; Tomoaki Shimoda, both of Iwakuni; Kimiyoshi Miura, Ohno; Kenichi Tominari, Narashino; Akio Kanezawa, Sodegaura, all of Japan

[73] Assignee: GE Plastics Japan Ltd., Japan

[21] Appl. No.: 330,141

[22] Filed: Oct. 24, 1994

Related U.S. Application Data

[62] Division of Ser. No. 22,710, Mar. 1, 1993, Pat. No. 5,364,926.

[51] Int. Cl.⁶ .................................................. C08G 64/00
[52] U.S. Cl. ...................... 528/198; 524/611; 524/706; 524/742; 524/751; 528/196; 528/502
[58] Field of Search ................... 524/611, 706, 524/742, 751; 528/198, 196, 502

[56] References Cited

U.S. PATENT DOCUMENTS

| | | | |
|---|---|---|---|
| 5,026,817 | 6/1991 | Sakashita et al. | 528/199 |
| 5,214,072 | 5/1993 | Fennhoff et al. | 521/40 |

OTHER PUBLICATIONS

Database WPI–Week 8736, Derwent Publications, Ltd., London, BG; AN 87–252422 & JP–A–62 172 019 *abstract*.

Database WPI–Week 9309, Derwent Publications Ltd., London, BG; AN 93–071176 & JP–A–5 017 564.

Database WPI–Week 873, Derwent Publications Ltd., London, BG; AN 87–302901 & JP–A–62 212 427.

*Primary Examiner*—James J. Seidleck
*Assistant Examiner*—Terressa Mosley

[57] ABSTRACT

Object: The present invention was conceived in light of the above-described prior art. The object of this invention is to provide a method for preparing optical-grade polycarbonate compositions, which method is able to prepare with good productivity optical-grade polycarbonate compositions that have not only excellent clarity and water resistance, but also excellent retention stability such as heat stability and hue stability when molten and a low content of inclusions and impurities, and that undergo little heat deterioration.

Constitution: The method for preparing optical-grade polycarbonate compositions according to this invention, which method comprises the melt-polycondensation of an aromatic dihydroxy compound and a diester carbonate in the presence of a catalyst, followed by the addition of additives [B] while the polycarbonate [A] obtained as the reaction product is in a molten state, and mixing.

In this invention, it is preferable to prepare the optical-grade polycarbonate composition by filtration with a polymer filter following mixing.

13 Claims, No Drawings

METHOD FOR PREPARING OPTICAL-GRADE POLYCARBONATE COMPOSITIONS

This is a divisional of application Ser. No. 08/022,710 filed on Mar. 1, 1993, now U.S. Pat. No. 5,364,926.

DETAILED DESCRIPTION OF THE INVENTION

1. Field of the Invention

This invention relates to a method for preparing optical-grade polycarbonate compositions. More specifically, it relates to a method for preparing optical-grade polycarbonate compositions which is able to prepare with good productivity optical-grade polycarbonate compositions that not only have excellent clarity and water resistance, but also excellent retention stability such as heat stability and hue stability when molten and a low content of inclusions and impurities, and that undergo little heat deterioration.

2. Technical Background of the Invention

Polycarbonates have excellent mechanical properties such as impact resistance, in addition to which they also have outstanding heat resistance, clarity and other properties. As a result, they are widely used in such applications as various types of mechanical components, optical disks, and automotive parts. They hold an especially large promise in optical applications such as optical disks for memory, optical fibers and lenses, and are currently under intense research.

In such optical memory disk applications, the emergence of polycarbonates having low levels of impurities and foreign-matter has been awaited with special eagerness.

Methods for producing such polycarbonates that may be cited include a method whereby a prior-art aromatic dihydroxy compound such as bisphenol A is directly reacted with phosgene (interfacial process), and a method whereby an aromatic dihydroxy compound and a diester carbonate are transesterified (melt process, solid-phase process).

Of these, the interfacial process that employs phosgene uses a large amount of solvents such as methylene chloride; as a result, chlorine removal is extremely difficult and so chlorine tends to be present within the polycarbonate obtained, making the product unsuitable as an optical-grade polycarbonate.

In the interfacial process, the polycarbonate is obtained as a powder; but when molding stabilizers or the like are added to a polycarbonate powder such as this, re-melting and mixing of the polycarbonate powder must be carried out with an extruder or the like. At this time, the inclusion of foreign matter from the exterior readily occurs; steps taken to prevent this include installation of the extruder in a clean room; which requires a great deal of labor and major equipment, and invites high costs. Moreover, during this type of re-melting/mixing process, shearing heat is generated, sometimes resulting in heat deterioration of the polycarbonate.

Methods for the production of polycarbonate by means of transesterification are also known. In solid-phase processes of this type, the polycarbonate chips obtained at the end of polymerization are re-melted and mixed in the same manner as in interfacial processes, following which molding additives are added. Here too, the same problems arise as those described above.

Hence, a method has been awaited for preparing optical-grade polycarbon-ate compositions that is capable of efficiently producing optical-grade polycarbonate compositions which have an excellent clarity and water resistance, excellent retention stabilities such as heat stability and hue stability when molten, a low inclusions content, and which experience little heat deterioration.

OBJECT OF THE INVENTION

The present invention was conceived in light of the above-described prior art. The object of this invention is to provide a method for producing optical-grade polycarbonate compositions, which method is able to prepare with good productivity optical-grade polycarbonate compositions that have not only excellent clarity and water resistance, but also excellent retention stability such as heat stability and hue stability when molten, as well as low levels of inclusions and impurities, and also that undergo little heat deterioration.

The method for preparing optical-grade polycarbonate compositions according to this invention comprises the melt-polycondensation of an aromatic dihydroxy compound and a diester carbonate in the presence of a catalyst, followed by the addition of additives [B] while the polycarbonate [A] obtained as the reaction product is in a molten state, and mixing.

In this invention, it is desirable to prepare the optical-grade polycarbonate composition by filtration with a polymer filter following mixing.

According to the method for preparing optical-grade polycarbonate resin compositions of this invention, because the above additives [B] are added and mixing is carried out while the polycarbonate obtained as the reaction product of melt polycondensation is in a molten state, in addition to being able to prevent the inclusion of foreign matter during production, thermal decomposition due to the generation of shearing heat can be suppressed. As a result, optical-grade polycarbonate compositions having excellent clarity and water resistance, as well as excellent retention stability when molten can be stably and efficiently produced.

CONCRETE DESCRIPTION OF THE INVENTION

The method for preparing optical-grade polycarbonate compositions according to this invention shall now be described more concretely.

In this invention, first the polycarbonate [A] is prepared by melt-polycondensing an aromatic dihydroxy compound and a diester carbonate in the presence of a catalyst.

There is no particular limit on this type of aromatic dihydroxy compound, it being possible to cite compounds having formula [I] below.

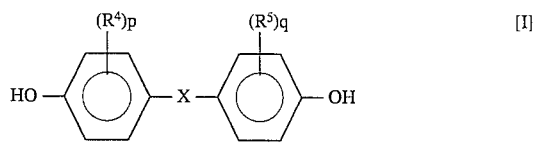

(where X is

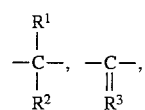

—O—, —S—, —SO— or $SO_2$; $R^1$ and $R^2$ are hydrogens or monovalent hydrocarbon groups; $R^3$ is a divalent hydrocarbon group; $R^4$ and $R^5$, which may be like or different, are halogens or monovalent hydrocarbon groups; and p and q are integers from 0 to 4).

Specific examples of these aromatic dihydroxy compounds that may be cited include bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane, and 2,2-bis(4-hydroxy-3-bromophenyl)propane; bis(hydroxyaryl)cycloalkanes such as 1,1-bis(4-hydroxyphenyl)cyclopentanes and 1,1-bis(4-hydroxyphenyl)cyclohexane; dihydroxyaryl ethers such as 4,4'-dihydroxydiphenyl ether and 4,4'-dihydroxy-4,4'-dimethylphenyl ether; dihydroxydiarylsulfides such as 4,4'-dihydroxydiphenylsulfide and 4,4'-dihydroxy- 3,'-dimethyldiphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3,3'-dimethyldiphenylsulfone.

Of these, the use of 2,2-bis(4-hydroxyphenyl)propane is especially preferable.

Compounds having formula [II] may be used as the aromatic dihydroxy compounds

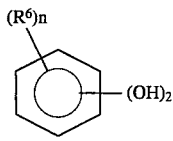

[II]

(where $R^6$, which may all be the same or may differ, are hydrocarbon groups having 1–10 carbons, the halides thereof, or halogens; and n is an integer from 0 to 4).

Specific example of the aromatic dihydroxy compounds having above formula [II] that may be cited include resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol and 2,3,4,6-tetrabromoresorcinol; catechol; and hydroquinone and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone and 2,3,5,6-tetrabromohydroquinone.

In addition, the 2,2,2',2'-tetrahydro-3,3,3',3'-tetramethyl-1,1'-spirobi[1H-indene] 6,6'-diols having the following formula can also be used as the aromatic dihydroxy compound in this invention.

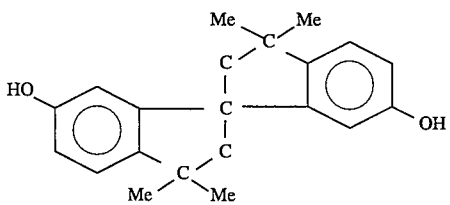

These aromatic dihydroxy compounds can be used alone or as combinations thereof.

Specific examples that may be cited of the diester carbonate include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate.

Of these, the use of diphenyl carbonate is especially preferable.

These diester carbonates may be used alone or as combinations thereof.

In addition, the above-cited diester carbonates may contain preferably no more than 50 mol %, and most preferably no more than 30 mol %, of dicarboxylic acids or dicarboxylic acid esters.

Examples that may be cited of such dicarboxylic acids or dicarboxylic acid esters include aromatic dicarboxylic acids such as terephthalic acid, isophthalic acid, diphenyl terephthalate and diphenyl isophthalate; aliphatic dicarboxylic acids such as succinic acid, glutaric acid, adipic acid, pimelic acid, suberic acid, azelaic acid, sebacic acid, decanedioic acid, dodecanedioic acid, diphenyl sebacate, diphenyl decanedioate and diphenyl dodecaneodioate; alicyclic dicarboxylic acid compounds such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate and diphenyl 1,4-cyclohexanedicarboxylate.

These dicarboxylic acids or dicarboxylic acid esters may be used alone or in combinations thereof.

The above-described diester carbonate should normally be used in an amount of 0.90–1.30 mole, and preferably 0.95–1.20 mole, per mole of the aromatic dihydroxy compound. By adjusting and using the diester carbonates and the aromatic dihydroxy compounds within the above-mentioned ranges, polycarbonates having the desired concentration of terminal hydroxyl groups can readily be prepared.

When preparing the polycarbonate in this invention, polyfunctional compounds having at least three functional groups per molecule can be used together with the above-described aromatic dihydroxy compounds and the diester carbonates.

These polyfunctional compounds are preferably compounds having phenolic hydroxyl groups or carboxyl groups; compounds having three phenolic hydroxyls are especially desirable. Specific examples that may be cited include 1,1,1-tris(4-hydroxyphenyl)ethane, 2,2',2"-tris(4-hydroxyphenyl)diisopropylbenzene, α-methyl-α,α',α"-tris(4-hydroxyphenyl)-1,4-diethylbenzene, α,α',α"-tris(4-hydroxyphenyl)-1,3,5-triisopropylbenzene, fluoroglycine, 4,6-dimethyl- 2,4,6-tri(4-hydroxyphenyl)-heptane-2, 1,3,5-tri(4-hydroxyphenyl)benzene, 2,2-bis-[ 4,4-(4,4'-dihydroxyphenyl)cyclohexyl]propane, trimellitic acid, 1,3,5-benzenetricarboxylic acid and pyromellitic acid.

Of these, preferable use can be made of 1,1,1-tris(4-hydroxyphenyl)ethane and α,α',α"-tris(4-hydroxyphenyl)-1,3,5-triisopropylbenzene.

The polyfunctional compound should generally be used in an amount of no more than 0.03 mole, preferably 0.001–0.02 mole, and most preferably 0.001–0.01 mole, per mole of the aromatic dihydroxy compound.

The aromatic dihydroxy compound and the diester carbonate furnished to the reaction in this invention should each preferably have less than 100 particles of foreign matter at least 0.1 μm in size, and 0 particles of foreign matter at least 20 μm in size, per gram thereof.

The aromatic dihydroxy compound and the diester carbonate should preferably each contain no more than 0.1 ppm of metals and ionic impurities.

In the preparation of the polycarbonate, in order to supply the above-described low-impurity aromatic dihydroxy compound and diester carbonate, these may be purified, for example, by washing and distillation, or filtration with a monofilter, then passed through a monofilter having the highest possible filtration accuracy, after which they may be sent directly to the polymerization step by means of a pipeline without coming into contact with outside air.

In this invention, the polycarbonate [A] is prepared by melt-polycondensing the above-described aromatic dihydroxy compound and diester carbonate.

Use may preferably be made of (a) alkali metal compounds and/or alkaline earth metal compounds as the catalyst in this invention.

Preferable examples that may be cited of these (a) alkali metal compounds and/or alkaline earth metal compounds include the organic acid salts, inorganic acid salts, oxides, hydroxides, hydrides or alcoholates of alkali metals and alkaline earth metals.

Specific examples of alkali metal compounds that may be cited include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogenphosphate, dipotassium hydrogenphosphate, dilithium hydrogenphosphate, the disodium, dipotassium and dilithium salts of bisphenol A, and the sodium, potassium and lithium salts of phenol.

Specific examples of alkaline earth metal compounds that may be cited include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

These compounds can be used alone or in combinations thereof.

These (a) alkali metal compounds and/or alkaline earth metal compounds are preferably used in an amount of $1\times10^{-8}$ to $1\times10^{-3}$ mole, and preferably $1\times10^{-7}$ to $2\times10^{-6}$ mole, per mole of the above aromatic dihydroxy compounds.

When the amount in which the (a) alkali metal compounds or the alkaline earth metal compounds are used is $1\times10^{-8}$ to $1\times10^{-3}$ mole per mole of the aromatic dihydroxy compound, a high polymerization activity can be maintained. Moreover, when the acidic compound (to be described later) is added in an amount that does not exert an adverse influence on the properties of the resulting polycarbonate, the basicity exhibited by these compounds can be weakened or fully neutralized.

In this invention, along with the above-described (a) alkali metal compound and/or alkaline earth metal compound, use can also be made of (b) basic compounds, and/or (c) boric acid compounds as catalysts.

These (b) basic compounds may be, for example, nitrogen-containing basic compounds that are either readily soluble or volatile at high temperatures. Specific examples that may be cited include the following compounds: ammonium hydroxides having alkyl, aryl, and alaryl groups such as tetramethylammonium hydroxide (Me$_4$NOH), tetraethylammonium hydroxide (Et$_4$NOH), tetrabutylammonium hydroxide (Bu$_4$NOH), and trimethylbenzylammonium hydroxide ($\phi$b-CH$_2$(Me)$_3$NOH); tertiary amines such as trimethylamine, triethylamine, dimethylbenzylamine and triphenylamine; secondary amines such as R$^2$NH (where R is an alkyl group such as methyl or ethyl, or an aryl group such as phenyl or toluyl); primary amines having the formula RNH$_2$ (where R means the same as above); imidazoles such as 2-methylimidazole and 2-phenylimidazole; or basic salts such as ammonia, tetramethylammonium borohydride (Me$_4$NBH$_4$), tetrabutylammonium borohydride (Bu$_4$NBH$_4$), tetrabutylammonium tetraphenylborate (Bu$_4$NBPh$_4$) and tetramethylammonium tetraphenylborate (Me$_4$NBPh$_4$).

Of these, preferable use can be made of tetraalkylammonium hydroxides, and especially electronics-grade tetraalkylammonium hydroxides having low levels of metal impurities.

When a basic compound (b) is used as the catalyst, the basic compound (b) is generally used in an amount of $1\times10^{-6}$ to $1\times10^{-1}$ mole, and preferably $1\times10^{-5}$ to $1\times10^{-2}$ mole, per mole of the aromatic dihydroxy compound.

Examples that may be cited of boric acid compounds (c) include boric acid and boric acid esters having the following formula:

$$B(OR)_n(OH)_{3-n}$$

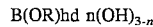

(where R is an alkyl such as methyl or ethyl, or an aryl such as phenyl; and n is 1, 2 or 3).

Specific examples that may be cited of these boric acid esters include trimethylborate, triethylborate, tributylborate, trihexylborate, triheptylborate, triphenylborate, tritolylborate and trinaphthylborate.

When (c) boric acid or a boric acid ester is used as the catalyst, this generally is used in an amount of $1\times10^{-8}$ to $1\times10^{-1}$ mole, preferably $1\times10^{-7}$ to $1\times10^{-2}$ mole, and most preferably $1\times10^{-6}$ to $1\times10^{-4}$ mole, per mole of the aromatic dihydroxy compound.

These are preferably used as combinations of, for example, (a) alkali metal compounds and/or alkaline earth metal compounds, and (b) nitrogen-containing basic compounds, or even more preferably as combinations of (a) alkali metal compounds and/or alkaline earth metal compounds, (b) nitrogen-containing basic compounds, and (c) boric acid or boric acid esters.

Catalysts obtained by thus combining (a) alkali metal compounds and/or alkaline earth metal compounds, and (b) nitrogen-containing basic compounds in the above-indicated amounts are desirable because they are able to promote the polycondensation reaction at a sufficient speed, and can induce the formation of high-molecular-weight polycarbonate at a high polymerization activity.

Also, catalysts obtained by combining all three components in the above-indicated amounts are desirable because they are able to produce polycarbonates which are resistant to heat deterioration such as declines in molecular weight.

The polycondensation reaction between the aromatic dihydroxy compound and the diester carbonate can be carried out in the presence of catalysts such as these under the same conditions as have hitherto been used in polycondensation reactions.

Specifically, the aromatic dihydroxy compound and the diester carbonate are reacted at a temperature of 80°–250° C., preferably 100°–230° C., and most preferably 120°–190° C., for a period of 0–5 hours, preferably 0–4 hours, and most preferably 0–3 hours, and at a normal temperature. Next, the reaction between the aromatic dihydroxy compound and the diester carbonate is carried out by raising the reaction temperature while lowering the pressure of the reaction system; ultimately, the polycondensation reaction between the aromatic dihydroxy compound and the diester carbonate is carried out at a vacuum of 5 mmHg or less, and preferably 1 mmHg or less, and at 240°–320° C.

The above-described polycondensation reaction may be carried out in a continuous or a batch-wise manner. However, this reaction is carried out in a continuous manner in the present invention because polycarbonate having a stable quality can be prepared at a low cost. The reaction apparatus used when carrying out the above reaction may be a tank-type, pipe-type, or column-type apparatus.

The polycarbonate [A] reaction product obtained in the above manner generally has an intrinsic viscosity, as measured in 20° C. methylene chloride, of 0.10–1.0 dl/g, and preferably 0.30–0.65 dl/g.

Because the above-described production method according to the present invention does not use the toxic substances phosgene or methylene chloride, the resulting polycarbonate contains no chlorine residues, which are a cause of pit errors; this is also desirable from the standpoint of environmental hygiene as well.

In this invention, the additives [B] are added and mixed immediately after the polycondensation reaction, without first cooling the polycarbonate [A] reaction product thus obtained. In other words, the additives [B] are added to and mixed with the molten polycarbonate [A] reaction product obtained within the reactor or extruder with the completion of the polycondensation reaction, this being done while the polycarbonate is still in a molten state.

This melt-mixing can be carried out at a normal pressure or under a vacuum. When melt-mixing is carried out under a vacuum, it is generally desirable that this be done at a pressure of 1–730 mmHg, preferably 5–700 mmHg, and most preferably 20–600 mmHg.

Specific examples that may be cited of the additives [B] used in this invention include:

(i) sulfur-containing acidic compounds having a pKa value of 3 or less, and/or derivatives formed from these acidic compounds, (ii) phosphorus compounds, (iii) epoxy compounds, (iv) phenol-based stabilizers.

Examples that may be cited of the above-described sulfur-containing acidic compounds having a pKa value of 3 or less and/or derivatives formed from these acidic compounds include sulfurous acids, sulfuric acids, sulfinic acid compounds, sulfonic acid compounds, and derivatives thereof.

Examples of sulfurous acid derivatives that may be cited include dimethyl sulfite, diethyl sulfite, dipropyl sulfite, dibutyl sulfite and diphenyl sulfite.

Examples of sulfuric acid derivatives that may be cited include dimethyl sulfate, diethyl sulfate, dipropyl sulfate, dibutyl sulfate and diphenyl sulfate.

Examples of sulfinic acid compounds that may be cited include benzenesulfinic acid, toluenesulfinic acid, and naphthalenesulfinic acid.

Examples of sulfonic acid compounds and their derivatives include compounds having formula [III] below, and their ammonium salts:

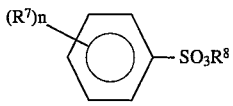

(where $R^7$ is a hydrocarbon group with 1–50 carbons (the hydrocarbon group may be substituted with halogens), $R^8$ is a hydrogen or a hydrocarbon group with 1–50 carbons (the hydrocarbon group may be substituted with halogens), and n is an integer from 0 to 3).

The following compounds may be cited as examples of such sulfonic acid compounds and their derivatives: sulfonic acids such as benzenesulfonic acid and p-toluenesulfonic acid; sulfonic acid esters such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate; and ammonium sulfonates such as ammonium p-toluenesulfonate.

In addition to the sulfonic acid compounds represented by above formula [III], sulfonic acid compounds such as trifluoromethanesulfonic acid, naphthalenesulfonic acid, sulfonated polystyrene and methyl acrylate-styrene sulfonate copolymers can also be cited.

These compounds may be used alone or as combinations thereof.

In this invention, it is preferable to use the sulfonic acid compounds and their derivatives represented by above formula [III] as (a) the sulfur-containing acidic compounds and derivatives formed from their acidic compounds. It is even more preferable to use compounds where, in formula [III] above, $R^7$ and $R^8$ are substituted aliphatic hydrocarbon groups having 1–10 carbons, and n is the integer 0 or 1. Specifically, preferable use can be made of benzenesulfonic acid, butyl benzenesulfonate, p-toluenesulfonic acid, ethyl p-toluenesulfonate and butyl p-toluenesulfonate. In this invention, the use of butyl p-toluenesulfonate is especially desirable.

In this invention, when the above-described (i) sulfur-containing acidic compounds having a pKa value of 3 or less and/or derivatives formed from these acidic compounds are used as additives [B], the (i) compounds are generally employed in an amount of 0.1–10 ppm, preferably 0.1–8 ppm, and most preferably 0.1–5 ppm, with respect to the above polycarbonate [A].

The phosphorus compounds (ii) may be phosphoric acids, phosphorus acids, hypophosphoric acids, pyrophosphoric acids, polyphosphoric acids, phosphoric acid esters, or phosphorous acid acids.

Specific examples of these phosphoric acid esters that may be cited include trialkylphosphates such as trimethylphosphate, triethylphosphate, tributylphosphate, trioctylphosphate, tridecylphosphate, trioctadecylphosphate, distearylpentaerythrityldiphosphate, tris(2-chloroethyl)phosphate and tris(2,3-dichloropropyl)phosphate; tricycloalkylphosphates such as tricyclohexylphosphate; and triarylphosphates such as triphenylphosphate, tricresylphosphate, tris(nonylphenyl)phosphate and 2-ethylphenyldiphenylphosphate.

Examples of phosphorous acid esters that may be cited include compounds having the formula $P(OR)_3$ (where R, which may all be the same or different, represents alicyclic hydrocarbon groups, aliphatic hydrocarbon groups or aromatic hydrocarbon groups).

Examples that may be cited of compounds having this formula include trialkylphosphites such as trimethylphosphite, triethylphosphite, tributylphosphite, trioctylphosphite, tris(2-ethylhexyl)phosphite, trinonylphosphite, tridecylphosphite, trioctadecylphosphite, tristearylphosphite, tris(2-chloroethyl)phosphite and tris(2,3-dichloropropyl)phosphite; tricycloalkylphosphites such as tricyclohexylphosphite; triarylphosphites such as triphenylphosphite, tricresylphosphite, tris(ethylphenyl)phosphite, tris(2,4-di-t-butylphenyl)phosphite, tris(nonylphenyl)phosphite and tris(hydroxyphenyl)phosphite; and arylalkylphosphites such as phenyldidecylphosphite, diphenyldecylphosphite, diphenylisooctylphosphite, phenylisooctylphosphite and 2-ethylhexyldiphenylphosphite.

Examples that may be cited of the phosphorous acid esters include distearylpentaerythritylphosphite and bis(2,4-di-t-butylphenyl)pentaerythrityldiphosphite.

These may be used alone or as combinations thereof.

Of these, the use of phosphorous acid esters having the above formula is preferable as the phosphorous compound (ii), with the use of an aromatic phosphorous acid ester being even more preferable, and the use of tris(2,4-di-t-butylphenyl)phosphite being most preferable.

In this invention, when a phosphorous compound (ii) is used as an additive [B], this is generally used in an amount of 10–1000 ppm, and preferably 50–500 ppm, with respect to the polycarbonate [A].

Compounds having one or more epoxy group per molecule may be used as the epoxy compound (iii). Specific examples that may be cited include epoxidized soybean oil, epoxidized linseed oil, phenylglycidyl ether, allylglycidyl ether, t-butylphenylglycidyl ether, 3,4-epoxycyclohexylmethyl-3',4'-epoxycyclohexylcarboxylate, 3,4-epoxy-6-methylcyclohexylmethyl-3',4'-epoxy-6'-methylcyclohexylcarboxylate, 2,3-epoxycyclohexylmethyl-3',4'-epoxycyclohexyl-carboxylate, 4-(3,4-epoxy-5-methylcyclohexyl)butyl-3',4'-epoxycyclohexylcarboxylate, 3,4-epoxycyclohexylethylene oxide, cyclohexylmethyl-3,4-epoxycyclohexylcarboxylate, 3,4-epoxy-6-methylcyclohexylmethyl-6'-methylcyclohexylcarboxylate, bisphenol A diglycidyl ether, tetrabromobisphenol A glycidyl ether, the diglycidyl ester of phthalic acid, the diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octylepoxythalate [sic], epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexylcarboxylate, N-butyl-2,2-dimethyl-3,4-epoxycyclohexylcarboxylate, cyclohexyl-2-methyl-3,4-epoxycyclohexylcarboxylate, N-butyl-2-isopropyl-3,4-epoxy-5-methylcyclohexylcarboxylate, octadecyl-3,4-epoxycyclohexylcarboxylate, 2-ethylhexyl-3',4'-epoxycyclohexylcarboxylate, 4,6-dimethyl-2,3-epoxycyclohexyl-3',4'-epoxycyclohexylcarboxylate, 4,5-epoxytetrahydrophthalic anhydride, 3-t-butyl-4,5-epoxytetrahydrophthalic anhydride, diethyl-4,5-epoxy-cis-1,2-cyclohexyldicarboxylate and di-n-butyl-3-t-butyl-4,5-epoxy-cis-1,2-cyclohexyldicarboxylate.

Of these, the use of alicyclic epoxy compounds is preferable, with the use of 3,4-epoxycyclohexylmethyl-3',4'-epoxycyclohexylcarboxylate being especially preferable.

These may be used alone or in combinations thereof.

When an epoxy compound (iii) such as this is used as an additive [B] in this invention, this epoxy compound (iii) is generally used in an amount of 1–2000 ppm, and preferably 10–1000 ppm, with respect to the above polycarbonate [A].

Specific examples that may be cited of (iv) phenol-type stabilizers include n-octadecyl-3-(4-hydroxy-3',5'-di-t-butylphenyl)propionate, tetrakis[methylene-3-(3',5'-di-t-butyl-4-hydroxyphenyl)propionate]methane, 1,1,3-tris(2-methyl-4-hydroxy-5-t-butylphenyl)butane, distearyl(4-hydroxy-3-methyl-5-t-butyl)benzylmalonate and 4-hydroxymethyl-2,6-di-t-butylphenol. These may used alone or as combinations thereof.

In this invention, when a phenol-type stabilizer is used as an additive [B], the phenol-type stabilizer (iv) is generally used in an amount of 10–1000 ppm, and preferably 50–500 ppm, with respect to the polycarbonate [A].

One or more of the additives selected from the group comprising (i), (ii), (iii) and (iv) described above may be used. When more than one of these additives is used, they may be added either separately or all at the same time; nor are there any restrictions on the order of addition. It is preferable that these additives [B] have low contents of inclusions.

Of the above-described additives [B], when (i) sulfur-containing acidic compounds having a pKa value of 3 or less and/or derivatives formed from these acidic compounds, (ii) phosphorus compounds, or (iv) phenol-type stabilizers are used, the alkaline catalyst remaining in the optical-grade polycarbonate composition is either neutralized or weakened, resulting in little gel formation, which is desirable. On the other hand, when (iii) epoxy compounds are added together with (i) or (ii) compounds, although the (i) or (ii) compounds remain in excess, these react with (iii) the epoxy compounds and are neutralized, thereby enhancing the retention stability during melting and giving an optical-grade polycarbonate composition having an even further improved quality.

In this invention, after adding the additives [B] to the polycarbonate [A] as described above and mixing, it is preferable that the composition be filtered with a polymer filter. The polymer filter used in this invention should have an absolute filtration accuracy of 0.5–50 μm, and preferably 0.5–20 μm.

When a polymer filter having this sort of absolute filtration accuracy is used, the filtration retention time becomes longer, and so heat deterioration of the optical-grade polycarbonate composition does not occur; this is also desirable because the filter then has a longer service life. By means of such filtration, optical-grade polycarbonate compositions from which inclusions of a size that causes pit errors have been removed can be obtained.

In this invention, it is preferable that the optical-grade polycarbonate composition obtained in the above manner be granulated either while in a molten state or in a softened state. Granulation may be carried out in air or in water, but it is preferable that this be carried out under conditions where the inclusion of foreign matter does not occur. When granulation is carried out in circulated water from which foreign matter has been removed, this process can be carried out without requiring expensive facilities such as a large-scale clean room.

Moreover, when the polycarbonate resin composition is granulated while in a molten or softened state, the entry into the composition of metal shed by the cutter blade during granulation can be prevented.

In this invention, as described above, because the optical-grade polycarbonate composition is produced by adding the additives [B] while the above-described polycarbonate [A] obtained as the reaction product is in a molten state, the number of heat cycles incurred during production is low, in addition to which heat degradation due to the generation of shearing heat can be suppressed. As a result, optical-grade polycarbonate compositions can be efficiently and stably produced without gel formation, heat deterioration during production due to decreases in molecular weight, or discoloration. Also, compared with methods whereby chips or powder is re-melted and additives such as stabilizers are added, optical-grade polycarbonate compositions containing little included foreign matter can be prepared.

Moreover, with regard to the optical-grade polycarbonate compositions obtained by means of this invention, because the additives are added while the polycarbonate is in a molten state, the retention stability such as the heat stability when molten is increased. Consequently, when various additives other than those mentioned above are compounded and molding is carried out, even when the pellets obtained from these optical-grade polycarbonate compositions are re-melted, thermal decomposition of the polycarbonate is suppressed, making it resistant to decreases in molecular weight. In addition, these optical-grade polycarbonate compositions do not readily discolor even when melted.

In this invention, when optical-grade polycarbonate compositions are produced, various other additives [C] such as conventional heat stabilizers, ultraviolet light absorbers, parting agents, colorants, antistatic agents, slip agents, antiblocking agents, lubricants, anti-fogging agents, natural oils, synthetic oils, waxes, organic filters and inorganic filters may be added within a range that does not compromise the object of this invention. It is preferable that these other additives [C] be added to the molten polycarbonate [A] together with the additives [B] described earlier.

These heat stabilizers may be, for example, organic thioether-type stabilizers or hindered amine-type stabilizers.

Specific examples that may be cited of thioether stabilizers include dilauryl thiodipropionate, distearyl thiodipropionate, dimyristyl-3,3'-thiodipropionate, ditridecyl-3,3'-thiodipropionate and pentaerythritol tetrakis(β-laurylthiopropionate).

These may be used alone or as mixtures of two or more thereof.

Examples of hindered amine stabilizers that may be cited include bis(2,2,6,6-tetramethyl-4-piperidyl)sebacate, bis(1,2,2,6,6-pentamethyl-4-piperidyl)sebacate, 1-[2-{3-(3,5-di-t-butyl-4-hydroxyphenyl)propionyloxy}ethyl]-4-{3-(3,5-di-t-butyl-4-hydroxyphenyl)propionyloxy}-2,2,6,6-tetramethylpiperidine, 8-benzyl-7,7,9,9-tetramethyl-3-octyl-1,2,3-triazaspiro[4,5]undecane-2,4-dione, 4-benzoyloxy-2,2,6,6-tetramethylpiperidine, 2-(3,5-di-t-butyl-4-hydroxybenzyl)- 2-n-butylmalonic acid bis(1,2,2,6,6-pentamethyl-4-piperidyl) and tetrakis(2,2,6,6-tetramethyl-4-piperidyl)-1,2,3,4-butanetetracarboxylate.

These may be used alone or as mixtures of two or more thereof.

These heat stabilizers should preferably be used in an amount of 0.001–5 parts by weight, preferably 0.005–0.5 part by weight, and most preferably 0.01– 0.3 part by weight, per 100 parts by weight of the polycarbonate.

This type of heat stabilizer may be added in a solid state or in a liquid state.

These heat stabilizers should preferably be added when the polycarbonate [A] is in a molten state after it has been cooled from the final polymerizer and while it is being pelletized; by so doing, the number of heat cycles incurred by the optical-grade polycarbonate composition decreases. Moreover, when heat treatment is again carried out by extrusion, pelletization or the like, thermal decomposition can be suppressed because the optical-grade polycarbonate composition includes a heat stabilizer.

There is no particular restriction on the ultraviolet light absorber, the use of a conventional ultraviolet light absorber being acceptable. Examples that may be cited include salicylic acid-type ultraviolet light absorbers, benzophenone-type ultraviolet light absorbers, benzotriazole-type ultraviolet light absorbers and cyanoacrylate-type ultraviolet light absorbers.

Specific salicylic acid-type ultraviolet light absorbers that may be cited are phenyl salicylate and p-t-butylphenyl salicylate.

Specific examples of benzophenone-type ultraviolet light absorbers that may be cited include 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2-hydroxy-4-methoxy-2'-carboxybenzophenone, 2-hydroxy- 4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone, bis(5-benzoyl-4-hydroxy-2-methoxyphenyl)methane and 2-hydroxy-4-methoxybenzophenone-5-sulfonic acid.

Specific examples of benzotriazole-type ultraviolet light absorbers that may be cited include 2-(2'-hydroxy-5'-methylphenyl)benzotriazole, 2-(2'-hydroxy- 3',5'-di-t-butylphenyl)benzotriazole, 2-(2'-hydroxy-3'-t-butyl-5'-methylphenyl)- 5-chlorobenzotriazole, 2-(2'-hydroxy-3',5'-di-t-butylphenyl)-5-chlorobenzotriazole, 2-(2'-hydroxy-5'-t-octylphenyl)benzotriazole, 2-(2'-hydroxy- 3',5'-di-t-amylphenyl)benzotriazole, 2-[2'-hydroxy-3'-(3",4",5",6"-tetrahydrophthalimidomethyl)- 5'-methylphenyl]benzotriazole and 2,2'-methylenebis[4-(1,1,3,3-tetramethylbutyl)- 6-(2H-benzotriazole-2-yl)phenol.

Examples of cyanoacrylate-type ultraviolet absorbers that may be cited include 2-ethylhexyl-2-cyano-3,3-diphenylacrylate and ethyl-2-cyano-3,3-diphenylacrylate. These may be used alone or as mixtures of two or more thereof. These ultraviolet light absorbers generally can be used in an amount of 0.001–5 part by weight, preferably 0.005–1.0 part by weight, and most preferably 0.01–0.5 part by weight, per 100 parts by weight of the polycarbonate [A].

Conventional parting agents may be used as the parting agent, there being no particular restriction on these.

Hydrocarbon parting agents that may be cited include natural and synthetic paraffins, polyethylene waxes and fluorocarbons.

Fatty acid parting agents that may be cited include higher fatty acids such as stearic acid and hydroxystearic acid, and oxy fatty acids.

Examples of fatty amide-type parting agents that may be cited include fatty amides such as stearamide, and alkylene bis(fatty amides) such as ethylene bis(stearamide).

Examples of alcohol-type parting agents that may be cited include fatty alcohols such as stearyl alcohol and cetyl alcohol, polyhydric alcohols, polyglycol and polyglycerols.

Examples of fatty ester-type parting agents that may be cited include the lower alcohol esters of fatty acids, such as butyl stearate and pentaerythritol tetrastearate; the polyhydric alcohol esters of fatty acids, and the polyglycol esters of fatty acids.

Examples of silicone-type parting agents that may be cited include silicone oils.

These may be used alone or as mixtures of two or more thereof.

These parting agents generally can be used in an amount of 0.001–5 parts by weight, preferably 0.005–1 part by weight, and most preferably 0.01–0.5 part by weight, per 100 parts by weight of the polycarbonate [A].

The colorants employed may be pigments or dyes. There are both inorganic and organic colorants; either of these, or combinations of both, may be used as the colorant.

Specific examples that may be cited of inorganic colorants include oxides such as titanium dioxide and red oxide, hydroxides such as alumina white, sulfides such as zinc sulfide, selenides, ferrocyanides such as Prussian blue, chromates such as zinc chromate and molybdenum red, sulfates such as barium sulfate, carbonates such as calcium carbonate, silicates such as ultramarine, phosphates such as manganese violet, carbon such as carbon black, and metal-powder colorants such as bronze powder and aluminum powder.

Specific examples of organic colorants that may be cited include nitroso-type colorants such as naphthol green B, nitro-type colorants such as naphthol yellow S, azo-type colorants such as lithol red and bordeaux 10B, azo-type colorants such as naphthol red and chromophthal yellow, phthalocyanine-type pigments such as phthalocyanine blue and fast sky blue, and condensed polycyclic colorants such as indanthrone blue, quinacridone violet and dioxazine violet.

These colorants may be used alone as combinations thereof.

These colorants can generally be used in an amount of $1 \times 10^{-6}$ to 5 parts by weight, preferably $1 \times 10^{-5}$ to 3 parts by weight, and most preferably $1 \times 10^{-5}$ to 1 part by weight, with respect to 100 parts by weight of the polycarbonate [A].

The above-mentioned other additives [C] used are substances should preferably contain as little foreign matter as possible.

It is preferable that the above-described method for preparing optical-grade polycarbonate compositions according to this invention be carried out in a closed continuous reaction system that is fully integrated, from charging of the raw material up to the polycondensation reaction.

In this invention, additives and stabilizers are compounded while the polycarbonate [A] obtained after polycondensation is in a molten state, thereby making it possible to stably and inexpensively produce optical-grade polycarbonate resin compositions in which the inclusion of foreign matter and impurities from the exterior has been suppressed as much as possible.

ADVANTAGES OF THE INVENTION

By means of the method for preparing optical-grade polycarbonate compositions according to this invention, it is possible to efficiently produce optical-grade polycarbonate compositions in which there is little inclusion of foreign matter and impurities, the number of heat cycles incurred during production is low, and little heat deterioration occurs.

The optical-grade polycarbonate compositions obtained by means of this invention have excellent retention stabilities such as heat stability and hue stability during molding, in addition to which their water resistance and clarity are also outstanding.

The present invention shall now be illustrated by means of examples, although the invention is in no way limited by these examples.

EXAMPLES

In this specification, the intrinsic viscosity (IV), melt flow rate (MFR), hue or yellowness index (YI), light transmittance, haze, level of inclusions, level of impurities, and moisture resistance were measured as described below.

Intrinsic Viscosity (IV): This was measured in 20° C. methylene chloride using an Ubbelohde viscometer Hue: An injection-molded sheet having a thickness of 3 mm was molded at a cylinder temperature of 290° C., an injection pressure of 1000 kg/cm, a cycle time of 45 seconds, and a mold temperature of 100° C. The X, Y and Z values were measured by a transmission method using a Nippon Denshoku Kogyo Colorand Color Difference Meter ND-1001 DP, and the yellowness index (YI) was measured.

$$YI = 100 \frac{(1.277X - 1.060Z)}{Y}$$

Light Transmittance: This was measured in accordance with the method of ASTM D 1003, using the injection-molded sheet employed for hue measurement.

Haze: The haze of the injection-molded sheet employed for hue measurement was measured using an NDH-200 made by Nippon Denshoku Kogyo.

Measurement of Inclusions: The resin was collected in a clean booth through which air that had been passed through a 0.1-μm filter was Xblown under pressure, and the amount of inclusions was measured in 10 cc of a methylene chloride solution containing a 2% concentration of the resin using a liquid fine particle counter KL-10 (made by RION), and using KS-60 and KS-62 sensors.

Measurement of Impurities: Chlorine was determined by coulometry, iron by inductively coupled plasma emission spectrometry, and sodium and sulfur by atomic absorption spectrometry.

Moisture Resistance: An aluminum vapor-deposited (sputtered) disk having a thickness of 1.2 mm was placed in an oven at 80° C. and 85% humidity, and a peel test carried out using adhesive tape. Evaluation was carried out by calculating the ratio of the aluminum layer surface area that remained unpeeled after the test.

EXAMPLE 1

A first 250-liter stirring tank was charged with 0.44 kilomole of bisphenol A (GE Plastics Japan; chlorine, ≦0.1 ppm; iron, ≦0.1 ppm; sodium ≦0.1 ppm; sulfur, ≦0.1 ppm) passed through a 0.2-μm filter and 0.449 kilomole of diphenyl carbonate ("Eni"* Co.; chlorine, ≦0.1 ppm; iron, ≦0.1 ppm; sodium ≦0.1 ppm; sulfur, ≦0.1 ppm ), and these melted at 140° C. Next, while feeding bisphenol A and diphenyl carbonate at respective hourly rates of 0.16 kilomole and 0.163 kilomole so as to maintain this level, this mixed solution was sent to a second 50-liter stirring tank at an hourly rate, in terms of the bisphenol A, of 0.16 kilomole. The temperature of this stirring tank was maintained at 180° C.

* Translator's Note: Company names and trade names for which the English spellings have not been confirmed are enclosed in quotation marks.

Tetramethylammonium hydroxide and sodium hydroxide were added as the catalysts at respective hourly rates of 0.04 mole and 0.00016 mole ($1 \times 10^{-6}$ mole per mole of bisphenol A), the level was regulated so as to give a retention time of 30 minutes, and stirring was carried out.

Next, this reaction solution was fed to a third 50-liter stirring tank having a temperature of 210° C. and a pressure of 200 mmHg, at an hourly rate, in terms of the bisphenol A, of 0.16 kilomole. The level was regulated so as to give a residence time of 30 minutes, and stirring was carried out while distilling off and removing the phenol.

Next, this reaction mixture was fed to a fourth 50-liter stirring tank having a temperature of 240° C. and a pressure of 15 mmHg at an hourly rate, in terms of the bisphenol A, of 0.16 kilomole. The level was regulated so as to give a residence time of 30 minutes, and stirring was carried out while distilling off and removing the phenol. The intrinsic viscosity [η] of the reactant obtained when the reaction reached a steady state was 0.15 dl/g.

Next, the pressure of this reactant was raised with a gear pump, the product was forced into a centrifugal thin-film evaporator at an hourly rate, in terms of the bisphenol A, of 0.16 kilomole, and the reaction was made to proceed. The temperature and pressure of the thin-film evaporator were controlled at 270° C. and 2 mmHg, respectively. The reactant was then fed at an hourly rate, based on the bisphenol A, of 0.16 kilomole (approximately 40 kg/hour) from the bottom of the evaporator to a twin-shaft horizontal stirring polymerization tank (L/D=3; stirring element rotation diameter, 220 ram; internal capacity, 80 liters) controlled to 270° C. and 2 mmHg. The intrinsic viscosity (IV) of the polymer at this time was 0.35 dl/g, and the ratio of phenol end groups to hydroxyl end groups was 91/9.

Next, this polymer was fed, while in a molten state, to a twin-screw extruder (L/D=17.5; barrel temperature, 265° C.) at an hourly rate, in terms of the bisphenol A, of 0.16 kilomole (approximately 40 kg/hour), following which butyl p-toluenesulfonate, tris(2,4-di-t-butylphenyl)phosphate ("Adeka Argus" Co.; Mark 2112), and 3,4-epoxycyclohexylmethyl-3',4'-epoxycyclohexyl carboxylate (Daicel Chemical Industries; "Celloxside" 2021P) were continuously mixed in respective amounts of 1.8 ppm, 100 ppm, and 100 ppm, all based on the polycarbonate. The resulting composition was passed through a die in a water tank through which water filtered with a 0.2-μm filter was circulated, cut with a cutter while in a molten state, then rendered into pellets. The results are presented in Table 1.

EXAMPLE 2

Aside from passing the composition through a 5-μm polymer filter after mixing in the additives, pellets were obtained in the same manner as in Example 1. The results are presented in Table 1.

COMPARATIVE EXAMPLE 1

Lexan powder (GE; IV=0.35 dl/g) produced by an interfacial process was placed in an environment having a cleanliness of 100 (100 particles or less of dust at least 0.5 μm in size per cubic foot), 100 ppm of tris(2,4-di-t-butylphenyl)phosphite ("Adeka Argus"; Mark 2112) and 100 ppm of 3,4-epoxycyclohexylmethyl- 3',4'-epoxycyclohexyl carboxylate (Daicel Chemical Industries; "Celloxside" 2021P) were added, and the mixture was extruded at 270° C., passed through a 5-μm polymer filter, and pelletized. The product thus obtained was then evaluated. The results are presented in Table 1.

TABLE 1

|  | Example 1 | Example 2 | Comparative Example 1 |
|---|---|---|---|
| Initial properties |  |  |  |
| IV (dl/g) | 0.35 | 0.35 | 0.35 |
| YI | 0.8 | 0.8 | 1.4 |
| Light transmittance (%) | 90.8 | 90.8 | 90.8 |
| Haze | 0.3 | 0.3 | 0.3 |
| Inclusions (particles/g) |  |  |  |
| 1–2 μm | 11 | 5 | 248 |

TABLE 1-continued

|  | Example 1 | Example 2 | Comparative Example 1 |
|---|---|---|---|
| 2–10 μm | 1 | 0 | 35 |
| 10–40 μm | 0 | 0 | 8 |
| >50 μm | 0 | 0 | 0 |
| Impurities (ppm) |  |  |  |
| Chlorine | <0.1 | <0.1 | 0.2 |
| Iron | <0.1 | <0.1 | 0.1 |
| Sodium | <0.1 | <0.1 | <0.1 |
| Sulfur | <0.1 | <0.1 | <0.1 |
| Moisture resistance (% surface area of aluminum layer remaining unpeeled) |  |  |  |
| After 100 hours | 100 | 100 | 97 |
| After 300 hours | 100 | 100 | 65 |
| After 2000 hours | 100 | 100 | 4 |

We claim:

1. An improved method for preparing optical-grade polycarbonate compositions by melt-polycondensing an aromatic dihydroxy compound and a diester carbonate in the presence of a catalyst selected from the group consisting of (a) an alkali metal compound and a nitrogen-containing basic compound, (b) an alkaline earth metal compound and a nitrogen-containing basic compound, (c) an alkali metal compound, a nitrogen-containing basic compound and boric acid, (d) an alkaline earth metal compound, a nitrogen-containing basic compound and boric acid, (e) an alkali metal compound, a nitrogen-containing basic compound and a boric acid ester and (f) an alkaline earth metal compound, a nitrogen-containing basic compound and a boric acid ester to give a molten reaction product and adding to the reaction product an additive selected from the group consisting of (i) a sulfur-containing acidic compound having a pKa value no greater than 3, (ii) a phosphorus compound, (iii) an epoxy compound, (iv) a phenolic stabilizer and (v) a sulfur-containing acidic compound derivative having a pKa value no greater than 3 wherein the improvement comprises adding one or more of the additives to the molten reaction product and mixing the additive or additives with the reaction product before the temperature of the reaction product is reduced whereby heat degradation of the polycarbonate due to the generation of shearing heat is suppressed and the level of inclusions is reduced.

2. The method of claim 1 wherein a heat stabilizer selected from a thioether or a hindered amine is added with the additives.

3. The method of claim 2 wherein the heat stabilizer is a thioether.

4. The method of claim 3 wherein the thioether is selected from dilauryl thiodipropionate, distearyl thiodipropionate, dimyristyl-3,3'-thiodipropionate, ditridecyl-3,3'-thiodipropionate or pentaerythritol(β-laurylthiopropionate).

5. The method of claim 2 wherein the heat stabilizer is a hindered amine.

6. The method of claim 5 wherein the hindered amine is selected from bis(2,2,66-tetramethyl-4-piperidyl)sebacate, bis(1,2,2,6,6-pentamethyl-4-piperidyl)sebacate, 1-[2-{3,5-di-t-butyl-4-hydroxyphenyl)propionyloxy}ethyl]-4-{3-( 3,5-di-t-butyl-4-hydroxyphenol)propionyloxy}-2,2,6,6-tetramethylpiperidine, 8-benzyl-7,7,9,9-tetramethyl-3-octyl-1,2,3-triazaspiro[4,5]undecane-2,4dione, 4-benzoyloxy-2,2,6,6-tetramethylpiperidine, 2-(3,5-di-t-butyl-4-hydroxybenzyl)- 2-n-butylmalonic acid bis(1,2,2,6,6-pentamethyl-4-piperidyl) or tetrakis (2,2,6,6 -tetramethyl-4-piperidyl)-1,2,3,4-butanetetracarboxylate.

7. The method of claim 1 wherein the additives are added to the molten reaction product in the reactor.

8. The method of claim 1, wherein the additives are mixed with the molten reaction product at a pressure no greater than atmospheric pressure.

9. A method for preparing optical-grade polycarbonate compositions according to claim 1 wherein the aromatic dihydroxy compound and the diester carbonate each contain no more than 100 particles of foreign matter at least 0.1 µm in size per gram, and 0 such particles at least 20 µm in size.

10. A method for preparing optical-grade polycarbonate compositions according to claim 1 wherein the aromatic dihydroxy compound and the diester carbonate each contain no more than 0.1 ppm of metal or ionic impurities.

11. A method for preparing optical-grade polycarbonate compositions according to any one of claims 1–6, whereby (a) alkali metal compounds or alkaline earth metal compounds are used in an amount of $1\times10^{-8}$ to $1\times10^{-3}$ mole of the aromatic dihydroxy compound.

12. A method for preparing optical-grade polycarbonate compositions according to claim 1, whereby melt polycondensation is carried out continuously.

13. A method for preparing optical-grade polycarbonate compositions according to claim 1 wherein the optical-grade polycarbonate composition obtained is granulated while in a molten or softened state.

* * * * *